(12) United States Patent
Kemp et al.

(10) Patent No.: US 8,376,443 B2
(45) Date of Patent: Feb. 19, 2013

(54) STOW AWAY SEAT FOR A UTILITY VEHICLE

(75) Inventors: Jonathan Melven Kemp, Roseland, LA (US); P Enoch Stiff, River Hill, WI (US)

(73) Assignee: American SportWorks LLC, Fort Wayne, IN (US)

( * ) Notice: Subject to any disclaimer, the term of this patent is extended or adjusted under 35 U.S.C. 154(b) by 151 days.

(21) Appl. No.: 13/024,568

(22) Filed: Feb. 10, 2011

(65) Prior Publication Data

US 2011/0198879 A1    Aug. 18, 2011

Related U.S. Application Data

(60) Provisional application No. 61/303,958, filed on Feb. 12, 2010.

(51) Int. Cl.
*B60N 2/36* (2006.01)
*B60N 2/30* (2006.01)

(52) U.S. Cl. .................. 296/66; 296/64; 296/50; 297/15

(58) Field of Classification Search .............. 296/26.11, 296/50, 62, 64, 65.01, 65.05, 65.09, 66, 67, 296/68, 69; 297/15, 129, 283.2, 283.3, 310, 297/313, 331, 337, 354.1, 354.13, 357
See application file for complete search history.

(56) References Cited

U.S. PATENT DOCUMENTS

| | | | |
|---|---|---|---|
| 6,237,981 B1 * | 5/2001 | Selleck | 296/66 |
| 6,364,391 B1 * | 4/2002 | Everett | 296/51 |
| 7,980,628 B2 * | 7/2011 | Hu et al. | 297/188.1 |
| 8,002,331 B2 * | 8/2011 | Bowers | 296/183.2 |
| 8,075,040 B2 * | 12/2011 | Arnold | 296/69 |
| 8,096,600 B2 * | 1/2012 | Shinnoki et al. | 296/66 |
| 2007/0290521 A1 * | 12/2007 | Houston | 296/182.1 |
| 2009/0184536 A1 * | 7/2009 | Kubota | 296/65.09 |
| 2009/0256388 A1 * | 10/2009 | Tanaka et al. | 296/186.4 |
| 2011/0148088 A1 * | 6/2011 | Arnold et al. | 280/807 |
| 2011/0156424 A1 * | 6/2011 | Orihashi et al. | 296/26.1 |

* cited by examiner

*Primary Examiner* — Dennis Pedder
*Assistant Examiner* — Jason S Daniels
(74) *Attorney, Agent, or Firm* — Barnes & Thornburg LLP

(57) ABSTRACT

An embodiment of the present disclosure provides a utility vehicle that includes a cargo bed area, an adjustable seat assembly, a tailgate, and a latch. The adjustable seat assembly includes a seat portion and a backrest assembly. The adjustable seat assembly is selectively movable between seating and expanded cargo bed configurations. The seat portion is pivotally movable between the cargo bed area and a stowed position below the cargo bed area. The backrest assembly is pivotally movable from the cargo bed area to a stowed position adjacent the cargo bed area. The tailgate is pivotally attached to the backrest assembly. The latch on the tailgate is configured to selectively engage cargo bed area to hold the backrest assembly in the seating configuration and engage at least one coupling at the end of at least one of the cargo bed area at the rear bed opening.

13 Claims, 8 Drawing Sheets

STOW AWAY SEAT FOR A UTILITY VEHICLE

RELATED APPLICATIONS

The present application is related to and claims priority to U.S. Provisional Patent Application Ser. No. 61/303,958, filed on Feb. 12, 2010, entitled "Stow Away Seat for a Utility Vehicle." To the extent not included below, the subject matter disclosed in those applications is hereby expressly incorporated into the present application.

TECHNICAL FIELD AND SUMMARY

The present disclosure is related to small gas or electric powered utility vehicles. More particularly, this disclosure is related to a convertible seat/dump bed for use as part of these utility vehicles.

Utility vehicles are gas or electric powered carts used for transportation and small hauling. Examples of such vehicles include Landmaster, Chuck Wagon, Bulldog and Trail Wagon, all manufactured by American SportWorks.

An illustrative embodiment of this disclosure includes a configurable rear-facing passenger seat in the cargo box or area of a utility vehicle. The seat can be folded down to reveal an expanded cargo bed. This dual functionality increases the overall usefulness of the utility vehicle.

In one illustrative embodiment, a latch assembly holds the seat in the use position for carrying passengers. When desiring to increase the size of the cargo box, the latch assembly is unlatched allowing the whole seat assembly to move. The seat is illustratively pivotable so it can move away from the bed and position underneath the cargo box. This movement reveals the seat support underneath which pivots as well. The back rest and seat support are attached together with the seat support being pivotally attached to the sidewalls of the cargo box.

In a further illustrative embodiment, coupled adjacent the back rest and pivotally attached to the pivoting seat support bracket, though distal to that bracket, is a tailgate and frame member. The frame member helps support the back rest and folds down therewith when the seat assembly is tucked under the bed of the cargo box. The tailgate serves as additional support for the back seat. In one embodiment, the tailgate is also part of the latch assembly that locks and releases the seat frame to and from the bed. Furthermore, when the seat assembly is in its use position, the tailgate serves as a divider between seat and storage areas of the cargo box. When the seat assembly is stowed, the tailgate can also be suspended downward covering and, thereby, protecting the seat assembly. With the seat stowed, the tailgate is also free to pivot upwardly opposite the frame member. Using pins or other methods, the tailgate can couple to brackets extending from the sidewalls of the cargo box. This creates additional versatility of the tailgate beyond traditional tailgate functionality.

This cargo box may also include a step rail useful for providing a place for an occupant's feet while the seat assembly is being used and also stowing space under the cargo box when the seat is being stowed. The step rail assembly, that helps protect the seat assembly while stowed, can be illustratively attached to the rear frame of the cargo box with bolts.

Another illustrative embodiment of the present disclosure provides a utility vehicle that comprises a cargo bed area, an adjustable seat assembly, a tailgate, and a latch. The cargo bed area includes opposed upwardly extending sidewalls. A rear bed opening is located between ends of the sidewalls. A forward end is located opposite the rear bed opening. The adjustable seat assembly includes a seat portion and a backrest assembly. The adjustable seat assembly is selectively movable between seating and expanded cargo bed configurations. The seat portion is pivotally movable between the cargo bed area and a stowed position below the cargo bed area. The backrest assembly is pivotally movable from the cargo bed area to a stowed position adjacent the cargo bed area. The tailgate is pivotally attached to the backrest assembly. The latch on the tailgate is configured to selectively engage at least one of the sidewalls to hold the backrest assembly in the seating configuration and engage at least one coupling at the end of at least one of the sidewalls at the rear bed opening. This holds the tailgate at the rear bed opening to serve as a movable end wall when the seat assembly is located in the expanded cargo bed configuration.

In the above and other embodiments the utility vehicle may further comprise: the backrest assembly comprising a backrest and a seat support, wherein the seat support supports the seat portion when the backrest assembly is located in the seating configuration; at least one first bracket attached to the seat portion wherein the at least one first bracket being pivotally attached to one of the sidewalls; a pair of first brackets each attached to the seat portion and to one of the opposed sidewalls; the backrest assembly including a bracket pivotally attached to the cargo bed area at a location spaced apart from the pivotally attachment of the first bracket; the backrest assembly including a seat support that supports the seat portion when the seat portion is located in the seating configuration; the latch on the tailgate being selectively engageable with a channel located on a periphery of one of the sidewalls, wherein the latch engages the channel to hold the tailgate in the seating configuration and release from the channel when the tailgate is not in the seating configuration; a frame member coupled to backrest assembly and the tailgate; the seat portion and backrest assembly fitted into a cavity located under the cargo bed area when the seat portion and backrest assembly are located in the expanded cargo bed configuration; the seat support forms a portion of the cargo bed area when the backrest assembly is located in the expanded cargo bed configuration; moving the seat portion and backrest assembly to the expanded cargo bed configuration increases cargo space in the cargo bed area; a storage cavity which includes a step suspended below the cargo bed area by bars attaching to both the step and cargo bed area, wherein the storage cavity is configured to receive the seat portion and backrest assembly when located in the expanded cargo bed configuration; and the latch serving to selectively keep the backrest assembly in place as a backrest until the latch is removed from a channel on the sidewall.

Additional features and advantages of the stow away seat assembly will become apparent to those skilled in the art upon consideration of the following detailed descriptions exemplifying the best mode of carrying out the stow away seat assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the stow away seat assembly, and such exemplification is not to be construed as limiting the scope of the stow away seat assembly in any manner.

DETAILED DESCRIPTION OF THE DRAWINGS

Figure 1:
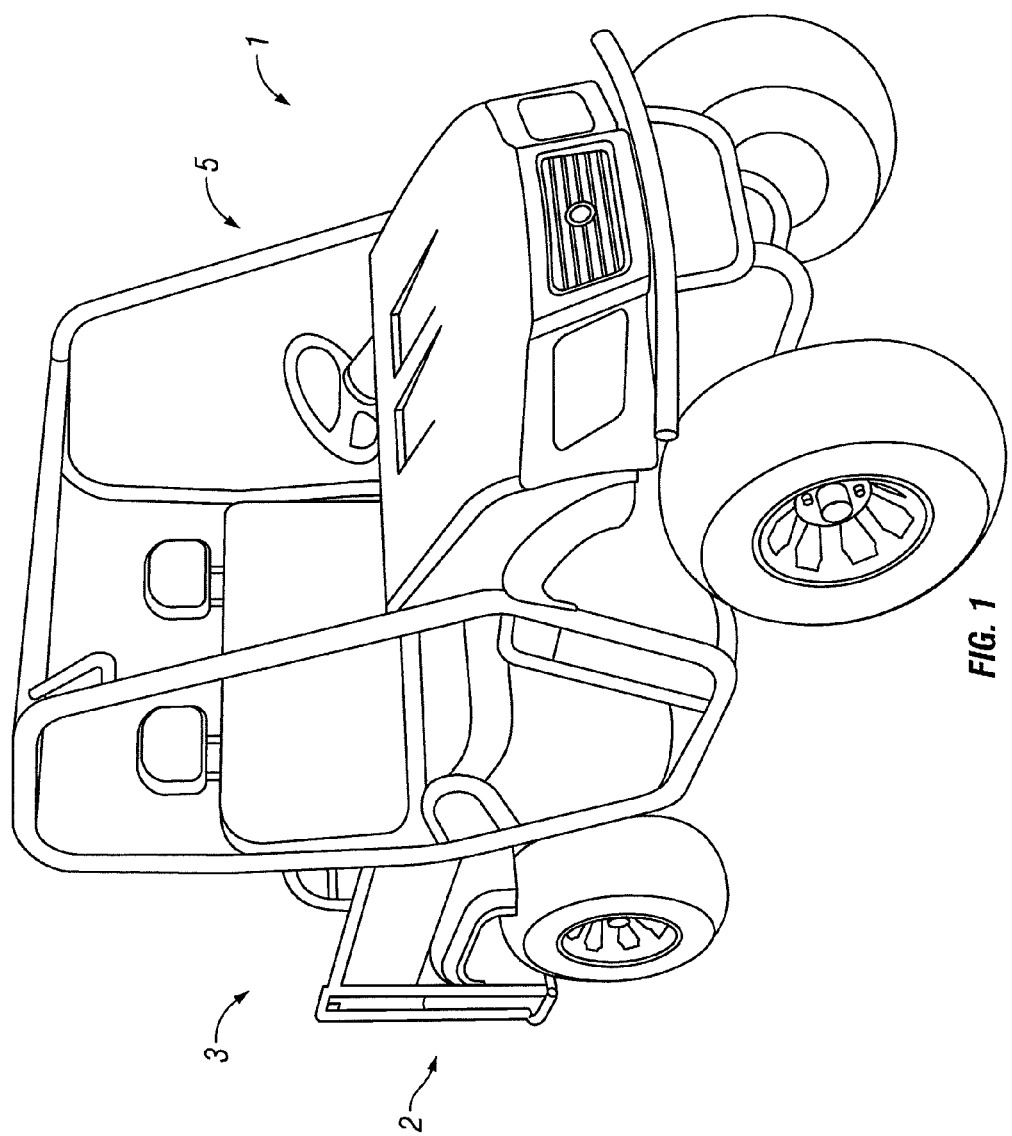
FIG. 1 is a perspective view of a utility or sport vehicle that includes an illustrative embodiment of a cargo area or box at its rear quadrant.

A perspective view of a sport or utility vehicle 1 that includes an illustrative embodiment of a cargo box-portion 2 at its rear quadrant 3 is shown in FIG. 1. This vehicle 1 may be a gas or electric powered cart used for transportation and small hauling. Typically, these vehicles hold two persons in the cab area 5. If room for more passengers is needed, seats can be added to the cargo area. More passenger room, however, may not always be necessary. Instead more cargo space may be useful. Vehicle 1 offers both by making a seating area convertible into a cargo area.

Figure 2:
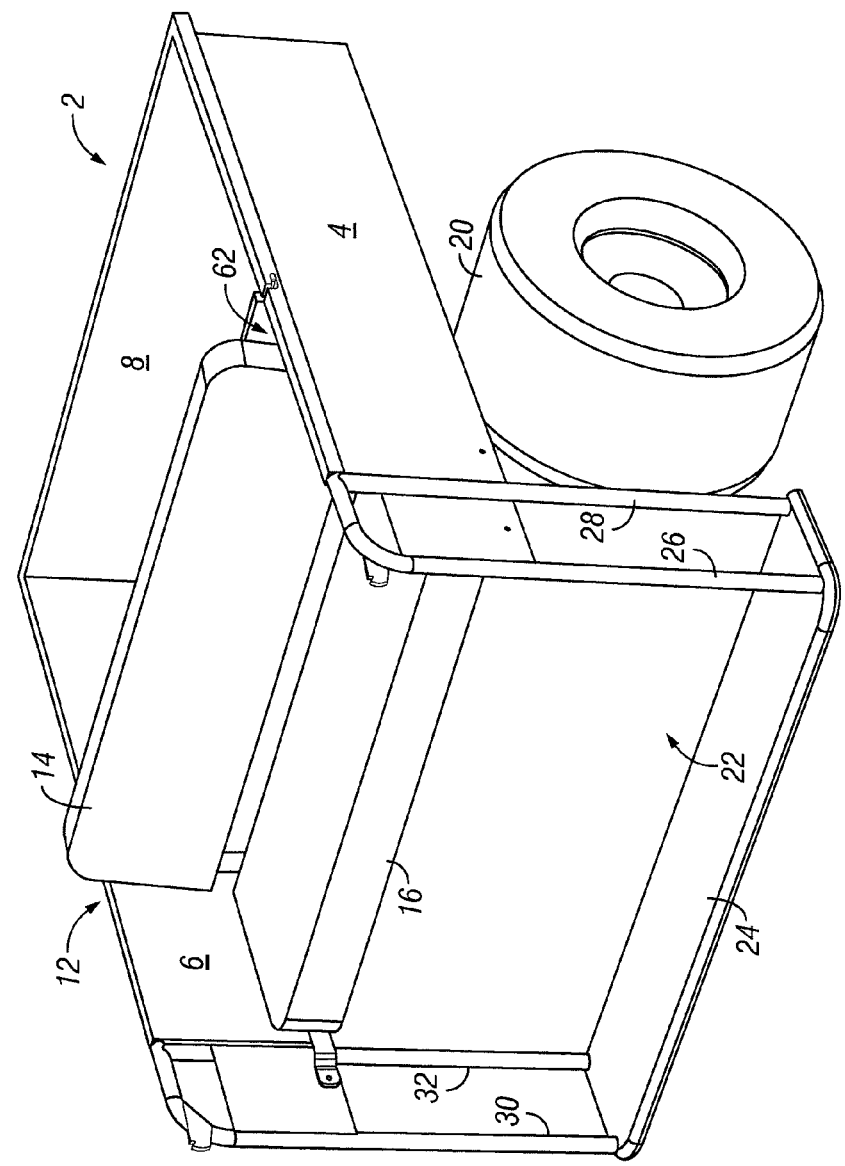
FIG. 2 is a perspective view of the cargo box-portion of the sport or utility vehicle of FIG. 1.

A perspective view of a cargo box-portion 2 of a utility vehicle is shown in FIG. 2. Walls 4, 6, and 8 bound bed 10 making box 2 useful for carrying various articles. This view also shows a portion of cargo box 2 being occupied by a seat assembly 12 that includes a back rest 14 and seat 16. All of this is suspended over the ground surface by wheel 20. A storage cavity 22 is formed via step rail 24 suspended below box 2 by bars 26, 28, 30, and 32 which bolts to the rear frame of the box. As this view shows, a useful rearward seat can be formed at the back end of cargo box 2 to transport persons from one place to another. At the same time this embodiment includes storage space in cargo box 2 with chair assembly 12 in the upright use position so articles can be transported along with persons.

Figure 3:
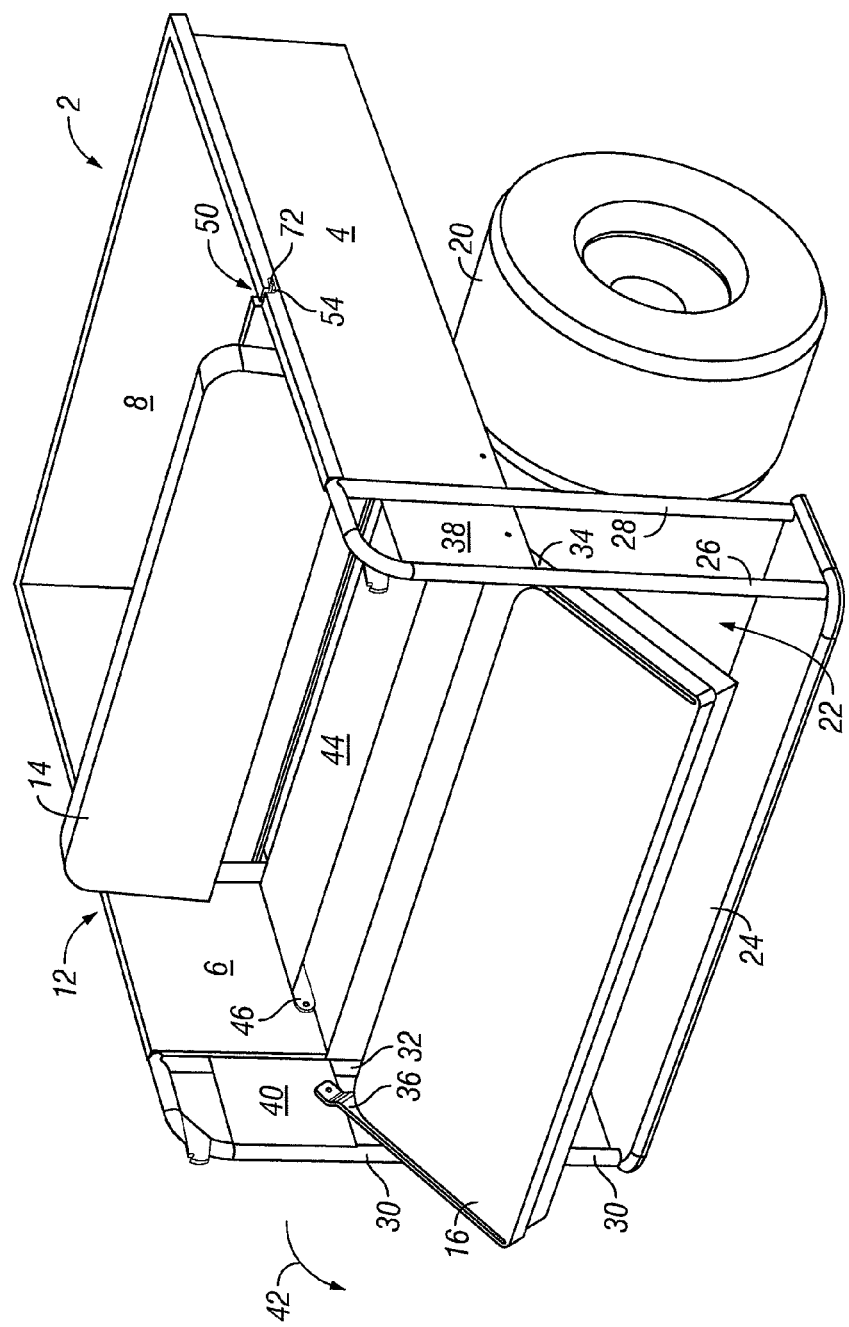
FIG. 3 is another perspective view of the cargo box-portion demonstrating how a portion of the cargo box can be moved to create additional cargo space.
Figure 4:
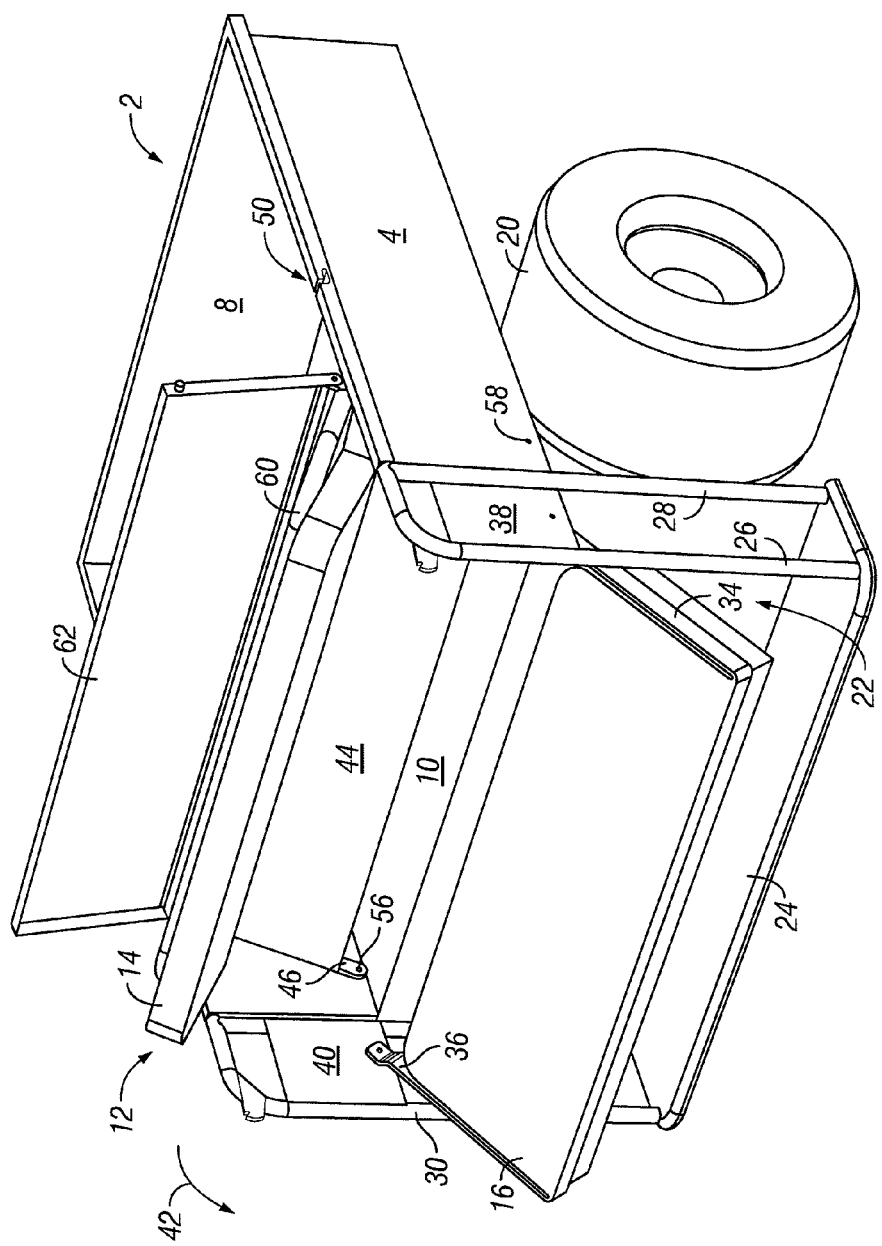
FIG. 4 is another perspective view of the cargo box showing how further adjustment can assist in creating a larger cargo area.

For instances when seat assembly 12 is not needed to carry any persons, but rather carry more cargo, FIGS. 3-6 show perspective progression views demonstrating how seat assembly 12 can be folded out of the way, thereby creating additional cargo space. As shown in FIG. 3, for example, seat 16 is attached to cargo box 2 via pivotally mounted brackets 34 and 36. In this illustrative embodiment, the brackets are pinned onto panels 38 and 40 that span between bars 26, 28, 30, and 32, respectively. As this figure shows, seat 16 pivots in direction 42 to fit into storage cavity 22. Movement of seat 16 reveals a seat support 44 that is attached to brackets 46 also pivotally attached to sides 4 and 6 in similar fashion to brackets 34 and 36. It is appreciated from this view that pivoting brackets 46 are spaced apart from brackets 34 and 36. Seat support 44 is attached to back rest 14. Latch assembly 50 keeps back rest 14 locked in place during seat use. When wanting to move seat assembly 12 to the stowed position, latch pins 72 and 74 are removed from channel 54 (see FIGS. 7 and 8) to release seat back 14. With latch assembly 50 unlatched, back rest 14, along with seat support 44, are free to pivot at points 56 and 58 from brackets 46, in direction 42, same as seat 16, as shown in FIG. 4.

In this illustrative embodiment, pivotally coupled to assembly 12 is frame member 60 and tailgate 62. In an illustrative embodiment, frame member 60 assists adding support to seat back 14. An illustrative embodiment of tailgate 62 includes a frame to illustratively receive at least a portion of frame member 60 when seat assembly 12 is in the use position. As this view begins to demonstrate, by pivoting seat assembly 12 in direction 42 more of bed 8 is exposed.

Figure 5:
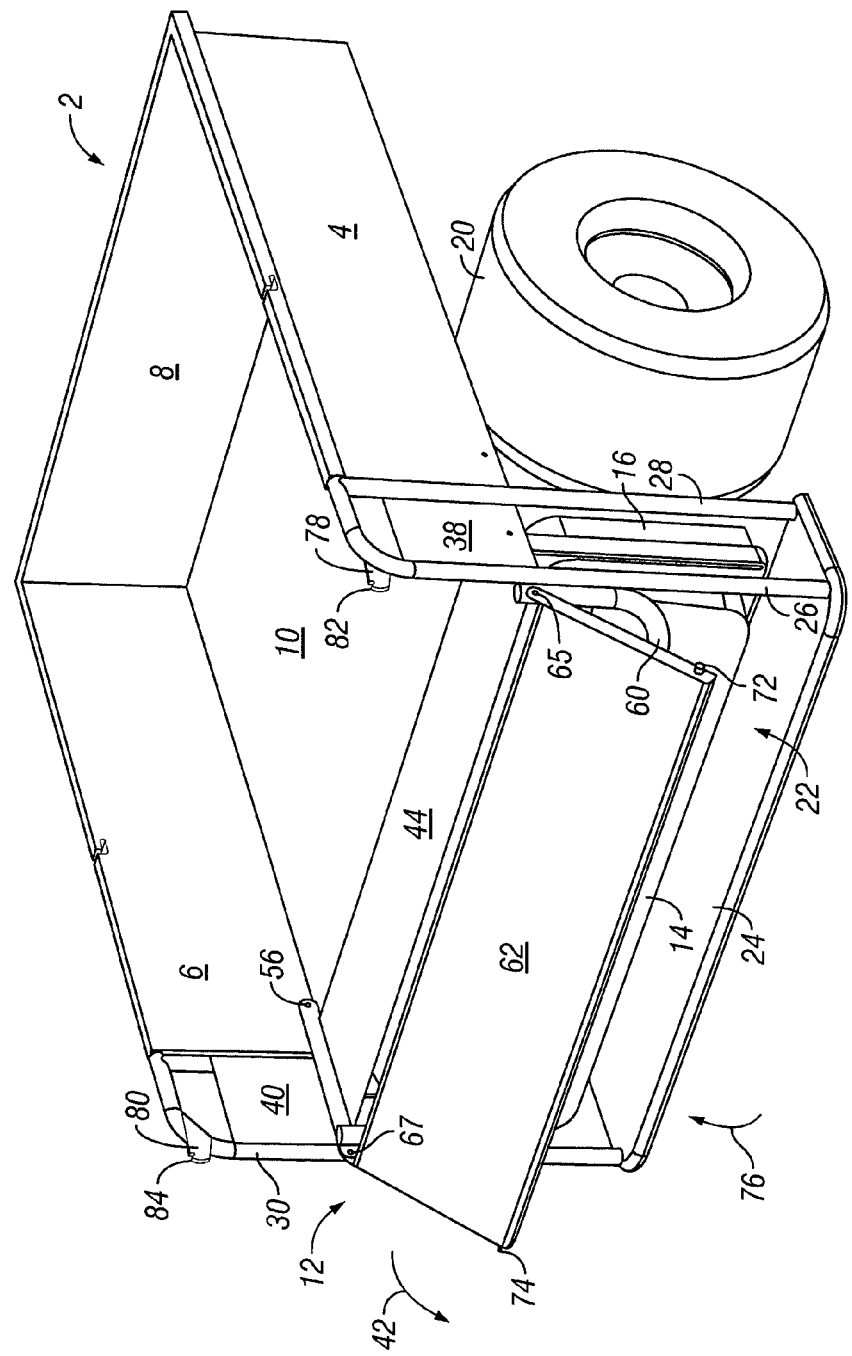
FIG. 5 is another perspective view of the cargo box demonstrating how it is further configurable to assist in creating more cargo space.

The view in FIG. 5 shows seat assembly 12 fitted into cavity 22, This view demonstrates how bed 10 is substantially expanded by moving seat assembly 12 out of the way. In addition, illustratively using the underside of seat support 44, in conjunction with panels 38 and 40, the effective cargo area of box 2 is expanded beyond only bed 10. Brackets 46 now extend upward from each side of seat support 44 to assist providing sidewalls to panels 38 and 40. Tailgate 62 illustratively includes pins 72 and 74. Because tailgate 62 is pivotally attached to brackets 46, it can swing in direction 76 to engage brackets 78 and, in particularly, notches 82 and 84. It is further appreciated from this view that tailgate 62 may also be used to cover seat assembly 12 stowed in cavity 22. In this case, tailgate 62 remains in the lowered position suspending from pivot pins 65 and 67. Shrouding seat assembly 12 protects it from damage that might occur during loading and unloading bed 10, for example.

Figure 6:
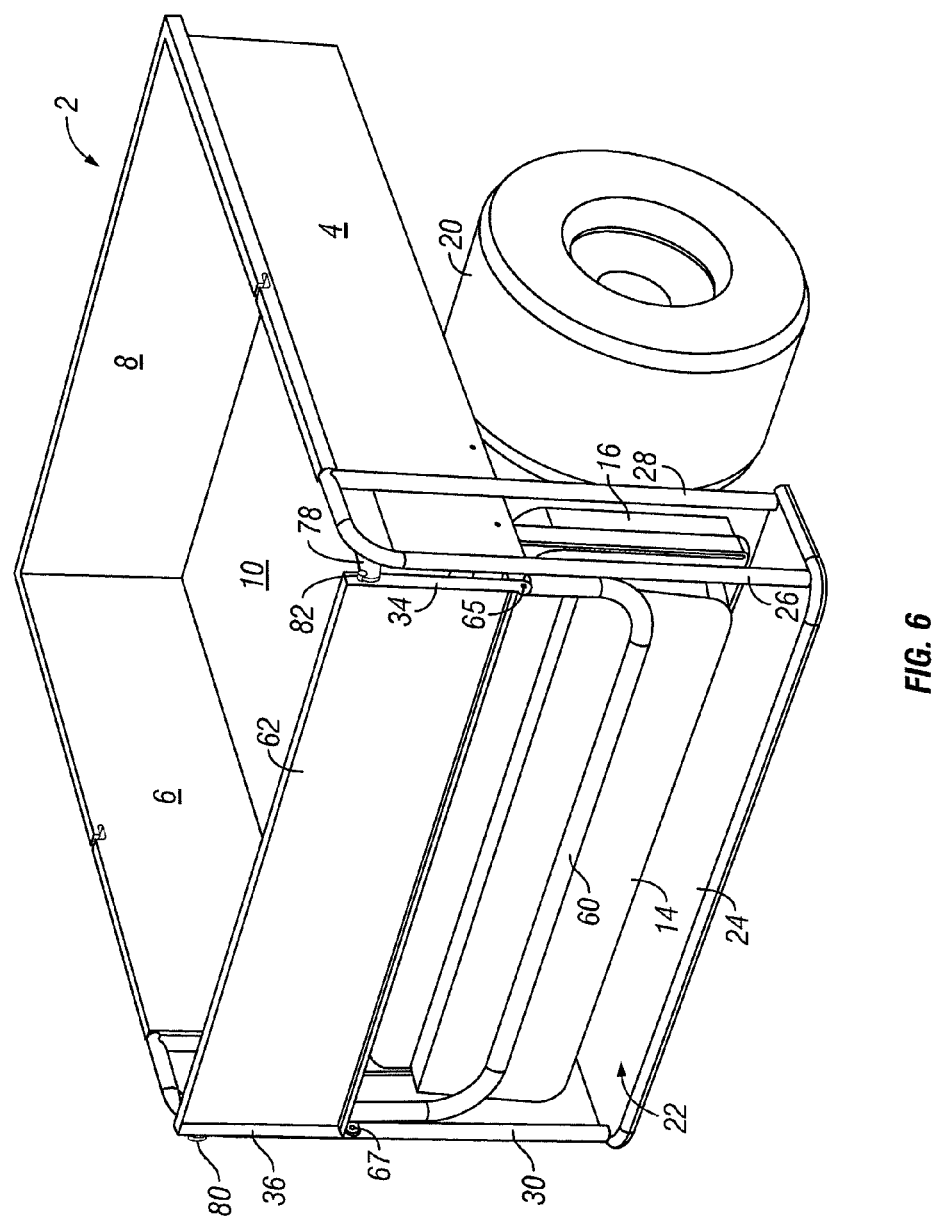
FIG. 6 is another perspective view of the cargo box showing it reconfigured to expand the cargo space portion of the box.

The perspective view of FIG. 6 shows tailgate 62 with pin 72 engaged in notch 82 of bracket 78. This holds tailgate 62 up providing a bounded storage space on all four sides of cargo box 2. This view also demonstrates how seat assembly 12 can be tucked within cavity 22 to keep it out of the way while cargo box 2 is being used.

Figure 7:
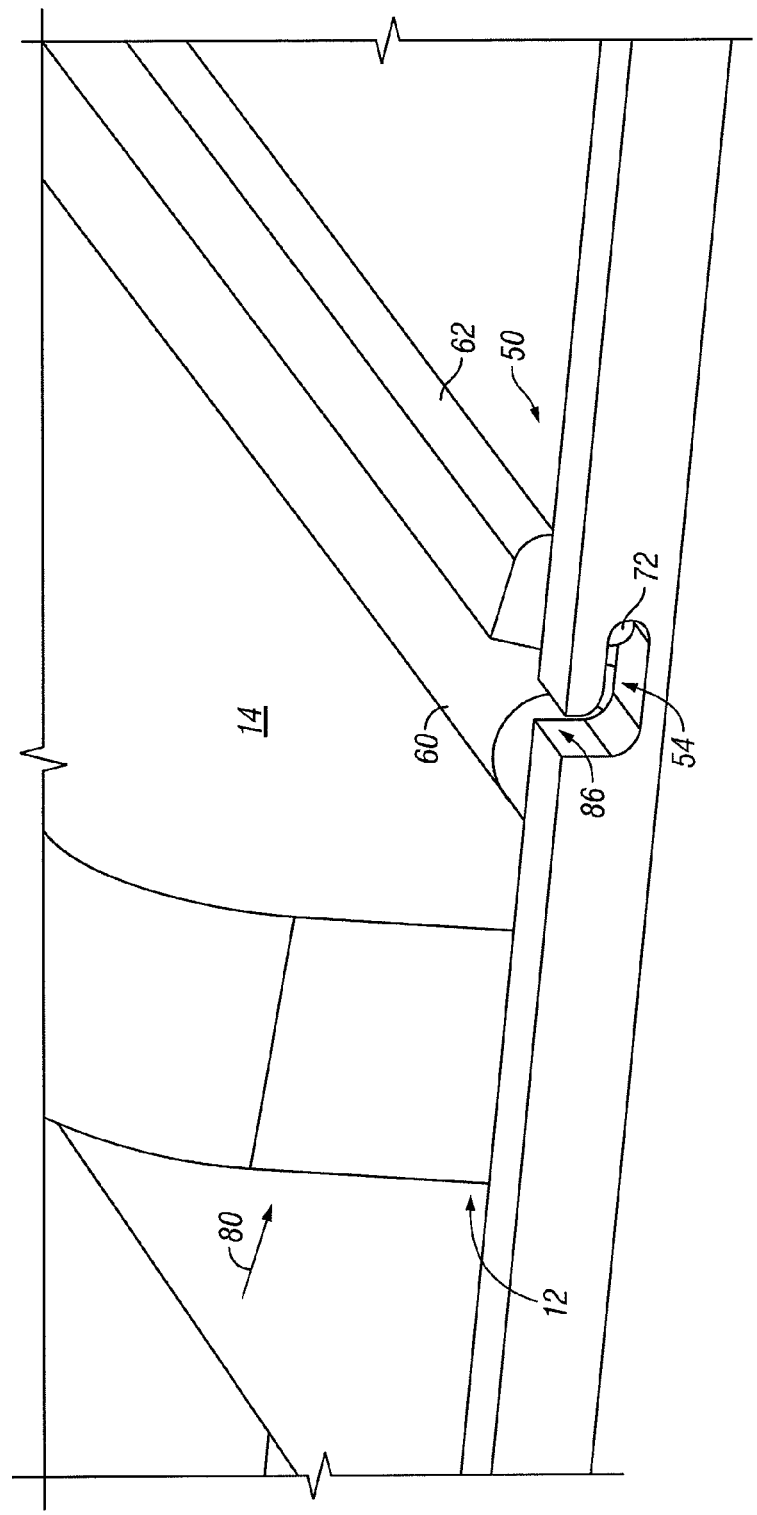
FIG. 7 is a detail perspective view of a latch assembly portion shown in a latched condition.
Figure 8:
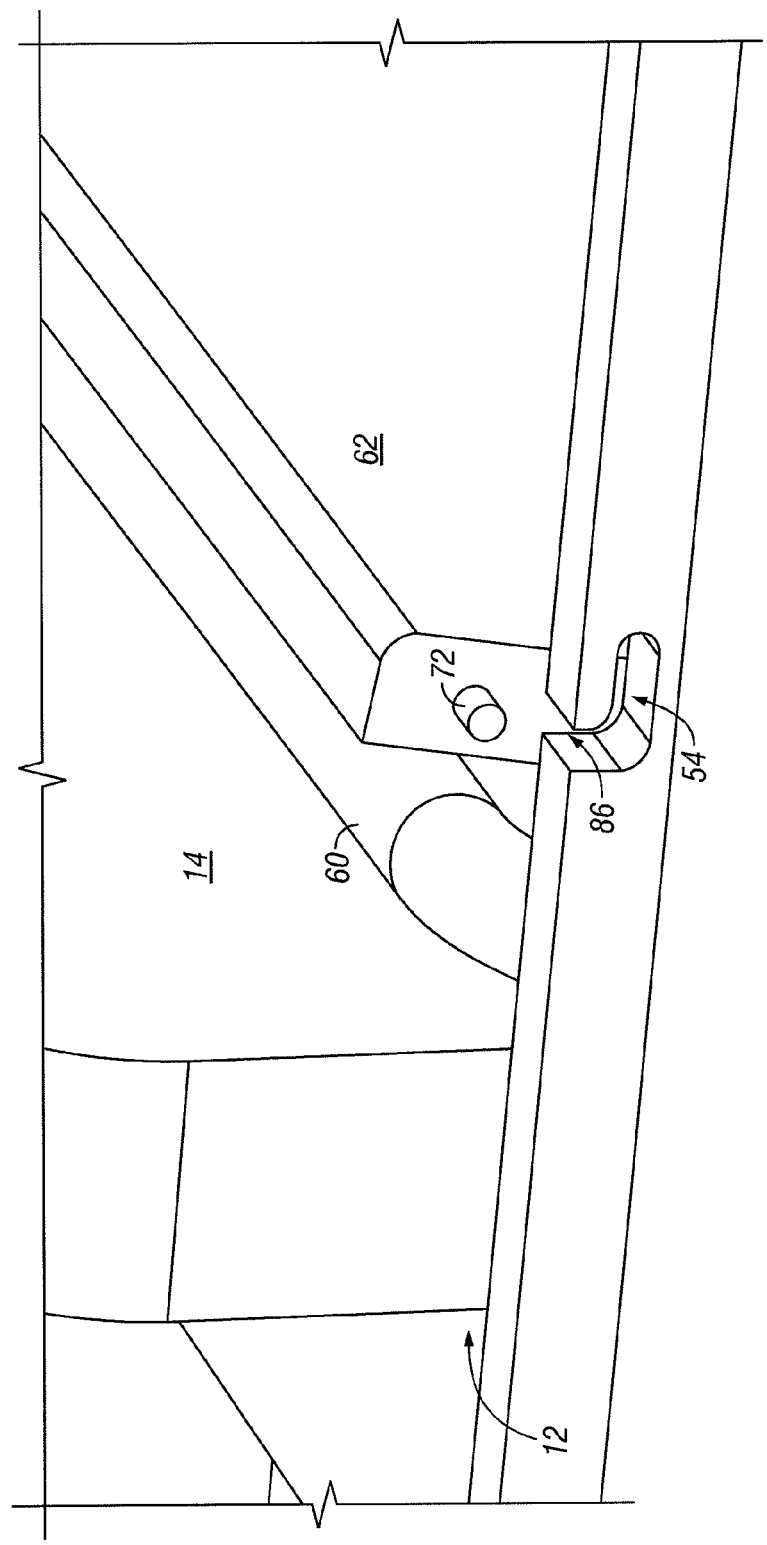
FIG. 8 is another perspective detail view of the latch assembly of FIG. 7 shown in an unlatched condition.

Perspective views of latch assembly 50 which includes pin 72, tailgate 62, and channel 54 are shown in FIGS. 7 and 8. Latch assembly 50 serves the dual purpose of selectively keeping seat back 14 in place until pin 17 is removed from channel 54 via opening 86, as well as providing support for seat back 14 when force is exerted in direction 80. In other words, tailgate 62 being held at channel 54 via pin 72 keeps the seat back 14 upright while a person is seated in seat assembly 12. The view in FIG. 8 depicts pin 72 on tailgate 62 exiting channel 54 through opening 86, thereby releasing seat back 14 allowing seat assembly 12 to move as previously discussed.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A utility vehicle comprising:
   a cargo bed area having opposed upwardly extending sidewalls, a rear bed opening located between ends of the sidewalls, and a forward end located opposite the rear bed opening;
   an adjustable seat assembly comprising a seat portion and a backrest assembly;
   wherein the adjustable seat assembly is selectively movable between seating and expanded cargo bed configurations;
   wherein the seat portion is pivotally movable between the cargo bed area and a stowed position below the cargo bed area;

wherein the backrest assembly is pivotally movable from the cargo bed area to a stowed position adjacent the cargo bed area;

a tailgate is pivotally attached to the backrest assembly; and a latch on the tailgate is configured to selectively engage at least one of the sidewalls to hold the backrest assembly in the seating configuration and engage at least one coupling at the end of at least one of the sidewalls at the rear bed opening to hold the tailgate at the rear bed opening to serve as a movable end wall when the seat assembly is located in the expanded cargo bed configuration.

2. The utility vehicle of claim 1, wherein backrest assembly comprises a backrest and a seat support, wherein the seat support supports the seat portion when the backrest assembly is located in the seating configuration.

3. The utility vehicle of claim 1, further comprising at least one first bracket attached to the seat portion wherein the at least one first bracket is pivotally attached to one of the sidewalls.

4. The utility vehicle of claim 1, further comprising a pair of first brackets each attached to the seat portion and to one of the opposed sidewalls.

5. The utility vehicle of claim 3, wherein the backrest assembly comprises a bracket pivotally attached to the cargo bed area at a location spaced apart from the pivotally attachment of the first bracket.

6. The utility vehicle of claim 1, wherein the backrest assembly comprises a seat support that supports the seat portion when the seat portion is located in the seating configuration.

7. The utility vehicle of claim 1, wherein the latch on the tailgate is selectively engageable with a channel located on a periphery of one of the sidewalls, wherein the latch engages the channel to hold the tailgate in the seating configuration and released from the channel when the tailgate is not in the seating configuration.

8. The utility vehicle of claim 1, further comprising a frame member coupled to the backrest assembly and the tailgate.

9. The utility vehicle of claim 6, wherein the seat portion and backrest assembly fitted into a cavity located under the cargo bed area when the seat portion and backrest assembly are located in the expanded cargo bed configuration.

10. The utility vehicle of claim 1, wherein the seat support forms a portion of the cargo bed area when the backrest assembly is located in the expanded cargo bed configuration.

11. The utility vehicle of claim 1, wherein moving the seat portion and backrest assembly to the expanded cargo bed configuration increases cargo space in the cargo bed area.

12. The utility vehicle of claim 1, further comprising a storage cavity which includes a step suspended below the cargo bed area by bars attaching to both the step and cargo bed area, wherein the storage cavity is configured to receive the seat portion and backrest assembly when located in the expanded cargo bed configuration.

13. The utility vehicle of claim 1, wherein the latch serves to selectively keep the backrest assembly in place as a backrest until the latch is removed from a channel on the sidewall.

* * * * *